United States Patent [19]

Angelotti

[11] 4,073,071
[45] Feb. 14, 1978

[54] HUMAN MOUTH MODEL FOR SPEECH THERAPY

[76] Inventor: Norma Angelotti, 24 Trumbull Ave., Haverhill, Mass. 01830

[21] Appl. No.: 754,445

[22] Filed: Dec. 30, 1976

[51] Int. Cl.² .............................................. G09B 19/04
[52] U.S. Cl. .................................................. 35/35 R
[58] Field of Search .............. 35/17, 35 R, 35 C, 7 R, 35/1; 32/71; 46/171, 154

[56] References Cited

U.S. PATENT DOCUMENTS

| 1,034,297 | 7/1912 | Priest | 32/71 |
| 1,667,205 | 4/1928 | Ingwersen | 35/17 UX |
| 1,850,899 | 3/1932 | Smith | 35/17 |
| 2,045,962 | 6/1936 | Rastetter | 35/17 UX |
| 2,138,254 | 11/1938 | Mink | 32/71 X |
| 2,266,434 | 12/1941 | Morrison | 32/71 X |
| 2,574,838 | 11/1951 | Olson | 35/17 |
| 3,236,006 | 2/1966 | Carroll | 46/171 X |
| 3,410,003 | 11/1968 | Sovijarvi et al. | 35/7 R X |
| 3,931,679 | 1/1976 | Carter | 35/17 X |

Primary Examiner—William H. Grieb
Attorney, Agent, or Firm—Joseph S. Iandiorio

[57] ABSTRACT

A human mouth model for speech therapy instruction including a transparent upper jaw portion including a hard palate portion, soft palate portion, gums, and a set of upper teeth; a transparent lower jaw portion including a mouth floor, gums, and a set of lower teeth; an opening formed by the rearward ends of the jaw portions in the area of the oral part of the pharynx; and hinge means interconnecting the rearward ends of the jaw portions.

3 Claims, 7 Drawing Figures

HUMAN MOUTH MODEL FOR SPEECH THERAPY

FIELD OF INVENTION

This invention relates to a human mouth model for speech therapy instruction, and more particularly to such a model possessing anatomical structure necessary for demonstrating tongue positions to form desired sounds.

BACKGROUND OF INVENTION

Generally, speech therapists teach their patients with charts, diagrams, written exercises, or recorded sounds which attempt to convey to the patient the proper formation of the tongue and lips to make a particular sound. These methods are often transformed into interesting and workable exercises, stories, and games to be practiced by the patient as a means of correcting speech impediments. This is a long and difficult procedure, partly because of the difficulty of the patients in understanding exectly how the tongue is to be placed and how it is to be manipulated in order to prevent an old habit and to reinforce a new habit which will result in the elimination of a speech impediment. This is an especially difficult area because traditionally the speech therapist can only use words to try and describe the necessary positions, manipulations, and desired results.

It is even more difficult for the extremely young, the deaf, the blind and the retarded than it is for those with normal faculties to understand how to position and manipulate their tongue pursuant to verbal directions. The therapist can indicate correct position of the tongue in her mouth or in the patient's mouth only with the mouth fully open so that the tongue can be viewed, in which case the full understanding of where the tongue must be and of how it must move during the formation and delivery of the sound cannot be conveyed. In addition, a complete viewing of the tongue is impossible, since the human demonstrator's mouth can be opened only to a limited extent and can be viewed from only one direction. Attempts to use certain other model mouths, such as those used in taxidermy and dental work, have met with indifferent success, for they are basically designed only to show teeth and teeth positions, and are not concerned with the subtelties of sound formation and speech. Such models are unsatisfactory, as are the mouths of human demonstrators, because it is impossible to see the position of the tongue from the back, from the top, and from the sides. This limits the ability of the therapist to convey to the patient the identity and function of the different parts of the mouth which cooperate with the tongue in its various positions to make desired sounds.

SUMMARY OF INVENTION

It is therefore an object of this invention to provide an improved human mouth model for speech therapy instruction.

It is a further object of this invention to provide such a mouth model which permits viewing of the interior of the cavity from both sides as well as from the front, back, bottom, and top.

It is a further object of this invention to provide such a mouth model which is capable of being completely opened so that the upper and lower portions of the oral chamber can be viewed alongside of each other.

It is a further object of this invention to provide such a mouth model which includes all necessary anatomical structures which cooperate with the tongue to form the desired sounds.

It is a further object of this invention to provide such a mouth model which enables the removing and replacing of one or more teeth in order that the interior may be more clearly viewed with the jaws closed or partially closed.

It is a further object of this invention to provide such a mouth model which has an opening for receiving a tongue member.

It is a further object of this invention to provide a tongue member which may be manipulated when installed in the mouth model to show various positions of the tongue when making desired sounds.

It is a further object of this invention to provide a tongue member which may be manipulated when installed in the mouth model to show various positions of the tongue and the movement of the tongue in the production of certain desired sounds.

This invention results from the realization that an extremely valuable tool for speech therapy instruction can be supplied by a human mouth model which provides sufficient anatomical structure for demonstrating tongue positions and movements to form desired sounds, in which the jaw portions are transparent and can be made to open to extremely wide openings, and are adapted for use in conjunction with a flexible tongue, which can be inserted in the mouth and used to demonstrate the proper position of the tongue as well as the proper movement of the tongue in the formation of the desired sound.

The invention features a human mouth model for speech therapy instruction. It includes a transparent upper jaw portion including a hard palate portion, soft palate portion, gums, and a set of upper teeth; and a transparent lower jaw portion including a mouth floor, gums, and a set of lower teeth. There is an opening formed by the rearward ends of the jaw portions in the area of the oral part of the pharynx adapted for receiving a tongue, and hinge means interconnect the rearward ends of the jaw portions.

In preferred embodiments, the tongue is formable and includes a flexible sheath with an interior recess which may be used to receive one or more fingers of the therapist or student, or the tongue may be made of a deformable and reformable substance. The upper and lower sets of teeth may include a full complement of teeth and one or more of the teeth, preferably the incisors, may be replaceably removable for viewing the interior of the mouth chamber.

DISCLOSURE OF PREFERRED EMBODIMENT

Other objects, features and advantages will occur from the following description of a preferred embodiment and the accompanying drawings.

The invention may be accomplished with a human mouth model for speech therapy instruction which is formed of a transparent upper jaw portion including a hard palate portion, soft palate portion, gums, and a set of upper teeth; and a transparent lower jaw portion including a mouth floor, raised frenulum attaching area, gums, and a set of lower teeth. The use of such anatomical details enables the model mouth of this invention to be used to show not only the desired position, shape and movement of the tongue, but also the position, shape and movement of the tongue in precise relationship to the surrounding areas of the oral cavity. The jaw portions, including the palate, gums, mouth floor, and teeth, are typically formed of a clear, transparent plastic such as styrene. Hinge means such as conventional plastic hinges or flexible plastic straps may be used to hingeably interconnect jaw portions at their rearward ends. A hollow tongue may be formed of latex or vinyl, and a deformable and reformable tongue may be formed of a properly shape lead sheath covered by latex or vinyl coating.

Figure 1:
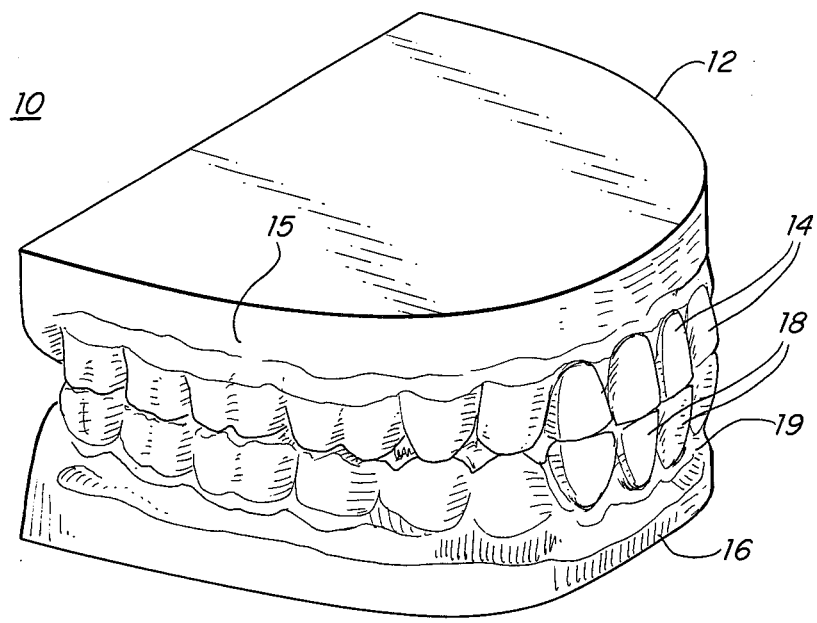
FIG. 1 is an axonometric front view of a human mouth model according to this invention.
Figure 2:
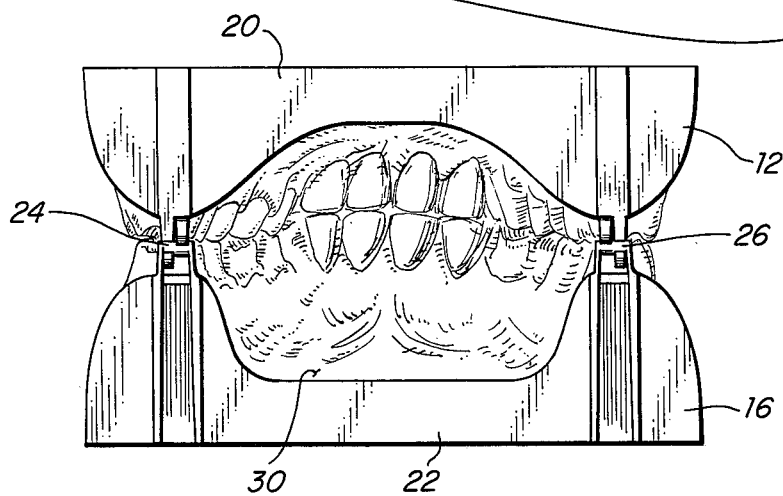
FIG. 2 is a rear elevational view of the mouth model of FIG. 1.
Figure 3:
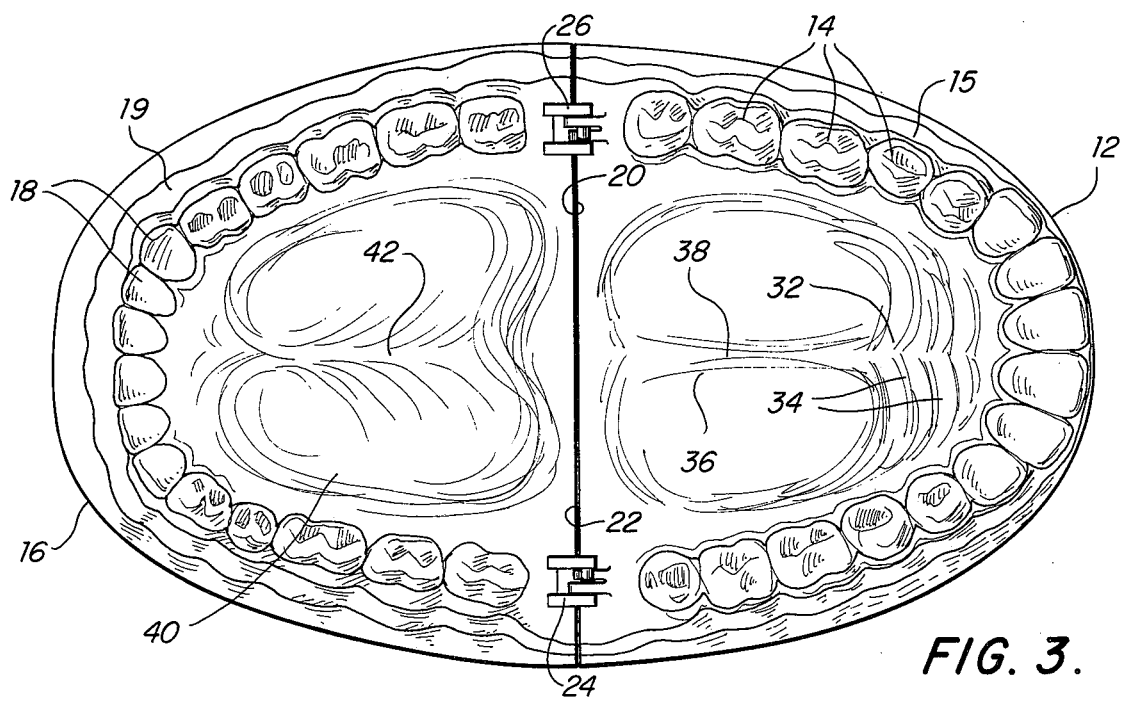
FIG. 3 is a plan view of the mouth model of FIG. 1 in the completely open position.

There is shown in FIG. 1 a mouth model 10 according to this invention including an upper jaw portion 12 having teeth 14 in gums 15 and a lower jaw portion 16 having teeth 18 in gums 19. The jaw portions are hingeably interconnected at their rearward ends 20, 22, by means of clear plastic hinges 24, 26, which are attached to the rearward ends 20, 22, of jaw portions 12 and 16. Hinges 24 and 26 are located toward the outside edges of rearward ends 20 and 22, leaving clear opening 30 in the area of the oral part of the pharynx. Hinges 24, 26 permit full 180° separation of jaw portions 12, 16 as shown in FIG. 3.

Mouth model 10 includes sufficient anatomical detail, especially in the interior cavity, to enable speech therapy patients and teachers to visualize the combinations of positions and movements of the tongue relative to parts of the surrounding oral cavity in order to perform desired sounds. Upper jaw portion 12, FIG. 3, includes a hard palate 32, with ridges 34; soft palate 36 with ridge 38 in the center; and gums 15, which surround the teeth 14. Similarly, lower jaw portion 16 includes the floor of the mouth 40 with a raised frenulum attaching area 42, in addition to teeth 18 and gums 19. Upper and lower jaw portions 12 and 16 are illustrated in the figures as containing a full complement of teeth 14 and 18, respectively.

Figure 4:
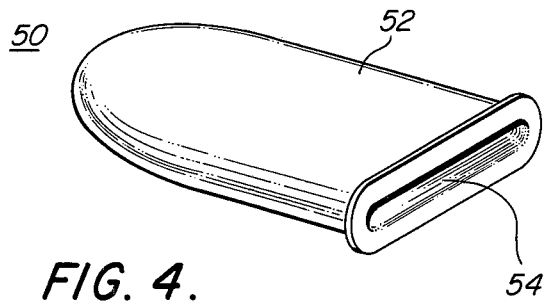
FIG. 4 is an axonometric view of a flexible hollow tongue according to this invention.
Figure 5:
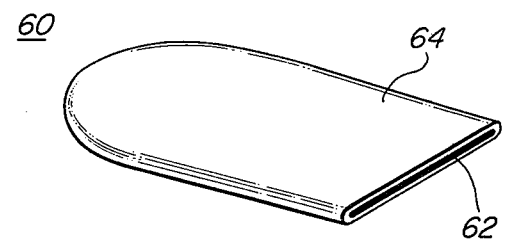
FIG. 5 is an alternative construction of a deformable and reformable tongue according to this invention.

Opening 30 is adapted to receive a tongue such as tongue 50, FIG. 4, or tongue 60, FIG. 5. Tongue 50 is formed of a hollow sheath 52 having a recess 54 in which one or more fingers of the user can be inserted to manipulate the tongue. In this manner, tongue 50 may be formed into any desired shape in any desired position of the mouth, and in addition may be manipulated and made to move to show the real action of the tongue as a particular sound is made.

Alternatively, tongue 60, FIG. 5, may be formed of a sheet 62 of deformable and reformable material such as lead, covered by a shell or coating 64. Tongue 60 may be set to any desired shape or position to demonstrate the configuration of the tongue to form a particular sound, and then may be flattened or reformed into another shape to demonstrate yet another sound.

Figure 6:
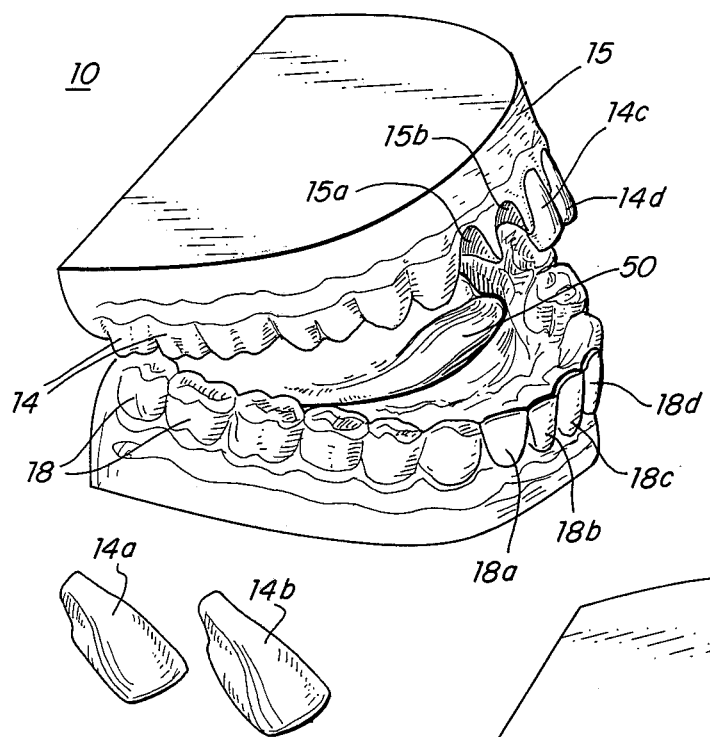
FIG. 6 is a view similar to FIG. 1 of the mouth model according to this invention with the mouth slightly open with some upper incisor teeth removed and a tongue as shown in FIG. 4 disposed therein.

One or more teeth 14 may be replaceably removable, such as the upper incisor teeth in FIG. 6, where it is illustrated that upper incisors 14a and 14b have been removed, leaving holes 15a and 15b in gums 15, while incisors 14c and 14d remain in position. Similarly, lower incisors 18a, 18b, 18c, and 18d may also be replaceably removable.

Figure 7:
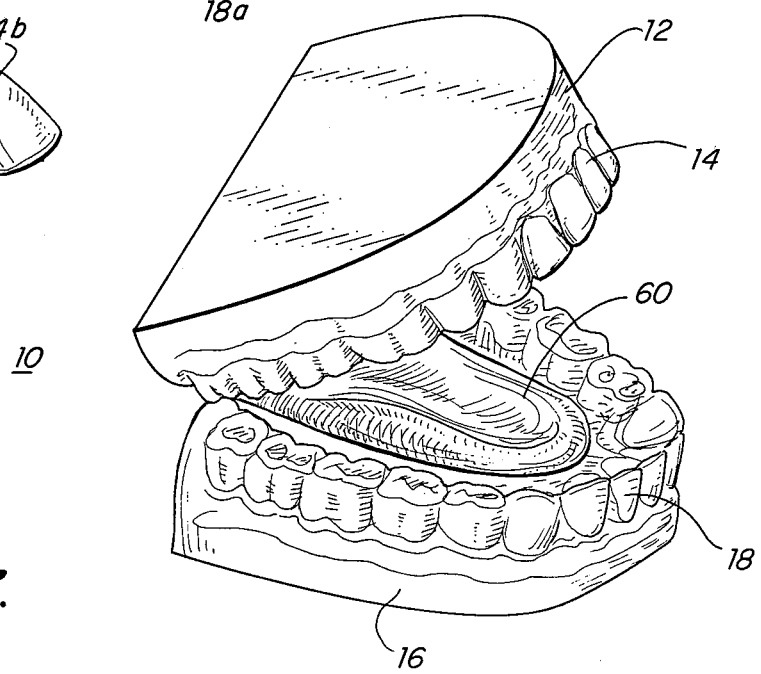
FIG. 7 is a view of the mouth model of FIG. 1 in an open position with the tongue shown in FIG. 5 disposed therein.

Tongue 50, FIG. 6, as shown installed in mouth model 10, has been manipulated by the user's hand to perform a particular desired shape. Similarly, tongue 60, FIG. 7, is shown deformed by being curled along its longitudinal axis.

Other embodiments will occur to those skilled in the art and are within the following claims:

What is claimed is:

1. A human mouth model having necessary anatomical structure for demonstrating tongue positions to form sound for speech therapy instruction comprising: a transparent upper jaw portion including a hard palate portion, a soft palate portion, gums and a set of upper teeth; a transparent lower jaw portion including a mouth floor, gums, and a set of lower teeth; at least one of said teeth in either set being replaceably removable; an opening formed by the rearward end of said jaw portions in the area of the oral part of the pharynx; a formable and deformable tongue in said mouth and accessible through said opening for manual manipulation; hinge means interconnecting the rearward ends of said jaw portions; said hinge means enabling said jaw portions to swing apart fully to a generally 180° open position.

2. The mouth model of claim 1 in which said tongue includes a flexible sheath with an interior recess.

3. The mouth model of claim 1 in which said tongue includes a flexible sheath covering a deformable and reformable member.

* * * * *